United States Patent
Sai

(10) Patent No.: US 11,277,196 B2
(45) Date of Patent: Mar. 15, 2022

(54) BASE STATION DEVICE, PROGRAM, CONTROL DEVICE, AND CONTROL METHOD

(71) Applicant: HAPSMobile Inc., Tokyo (JP)

(72) Inventor: Jutatsu Sai, Kanagawa (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/213,238

(22) Filed: Mar. 26, 2021

(65) Prior Publication Data

US 2021/0218465 A1 Jul. 15, 2021

Related U.S. Application Data

(63) Continuation of application No. PCT/JP2019/031752, filed on Aug. 9, 2019.

(30) Foreign Application Priority Data

Oct. 18, 2018 (JP) .............................. JP2018-196673

(51) Int. Cl.
*H04B 7/185* (2006.01)
*H01Q 1/24* (2006.01)

(52) U.S. Cl.
CPC ......... *H04B 7/18504* (2013.01); *H01Q 1/246* (2013.01); *H04B 7/18519* (2013.01); *H04B 7/18523* (2013.01); *H04B 7/18576* (2013.01)

(58) Field of Classification Search
None
See application file for complete search history.

(56) References Cited

U.S. PATENT DOCUMENTS

2013/0303182 A1 11/2013 Chung
2017/0208512 A1* 7/2017 Aydin .................. G05D 1/0202
(Continued)

FOREIGN PATENT DOCUMENTS

EP 1032236 A1 8/2000
JP 2002211496 A 7/2002
(Continued)

OTHER PUBLICATIONS (ISA/237) Written Opinion of the International Search Authority for International Patent Application No. PCT/JP2019/031752, mailed by the Japan Patent Office dated Sep. 10, 2019.
(Continued)

*Primary Examiner* — Shripal K Khajuria

(57) ABSTRACT

Provided is a base station device that is mounted in a flying object, forms a communication area on a ground, establishes a communication connection with a user terminal in the communication area, and provides a radio communication service to the user terminal, and comprises a connection control unit that, when the number of connected terminals is larger than a first threshold, performs admission control in response to a connection request received from the user terminal, and when the number of connected terminals is smaller than the first threshold and larger than a second threshold smaller than the first threshold, periodically selects a connection allowable group, executes a connection establishment process in response to a connection request from a user terminal included in the connection allowable group, and executes a request rejection process that rejects a connection request from a user terminal not included in the connection allowable group.

20 Claims, 7 Drawing Sheets

(56) References Cited

U.S. PATENT DOCUMENTS

| | | |
|---|---|---|
| 2017/0257779 A1 | 9/2017 | Zerick |
| 2020/0220612 A1* | 7/2020 | Thomas ............... H04B 17/309 |
| 2020/0367084 A1* | 11/2020 | Hjelm ................... H04W 24/02 |

FOREIGN PATENT DOCUMENTS

| | | |
|---|---|---|
| JP | 2010232811 A | 10/2010 |
| JP | 2016195448 A | 11/2016 |
| JP | 2017098797 A | 6/2017 |
| WO | 2015162460 A1 | 10/2015 |

OTHER PUBLICATIONS

Extended European Search Report for counterpart European Application No. 19873709.0, issued by the European Patent Office dated Oct. 22, 2021.

* cited by examiner

BASE STATION DEVICE, PROGRAM, CONTROL DEVICE, AND CONTROL METHOD

The contents of the following applications are incorporated herein by reference:
NO. 2018-196673 filed in JP on Oct. 18, 2018, and
NO. PCT/JP2019/031752 filed in WO on Aug. 9, 2019

BACKGROUND

1. Technical Field

The present invention relates to a base station device, a program, a control device, and a control method.

2. Related Art

There has been known a flying object which has an antenna and flies in the stratosphere in order to provide a stratosphere platform (for example, see Patent Literature 1).

CITATION LIST

Patent Literature

Patent Literature 1: Japanese Patent Application Publication No. 2002-211496

Technical Problem

When providing a radio communication service to a number of communication terminals such as a stratosphere platform, it is desirable to provide a technology that can appropriately perform congestion control.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
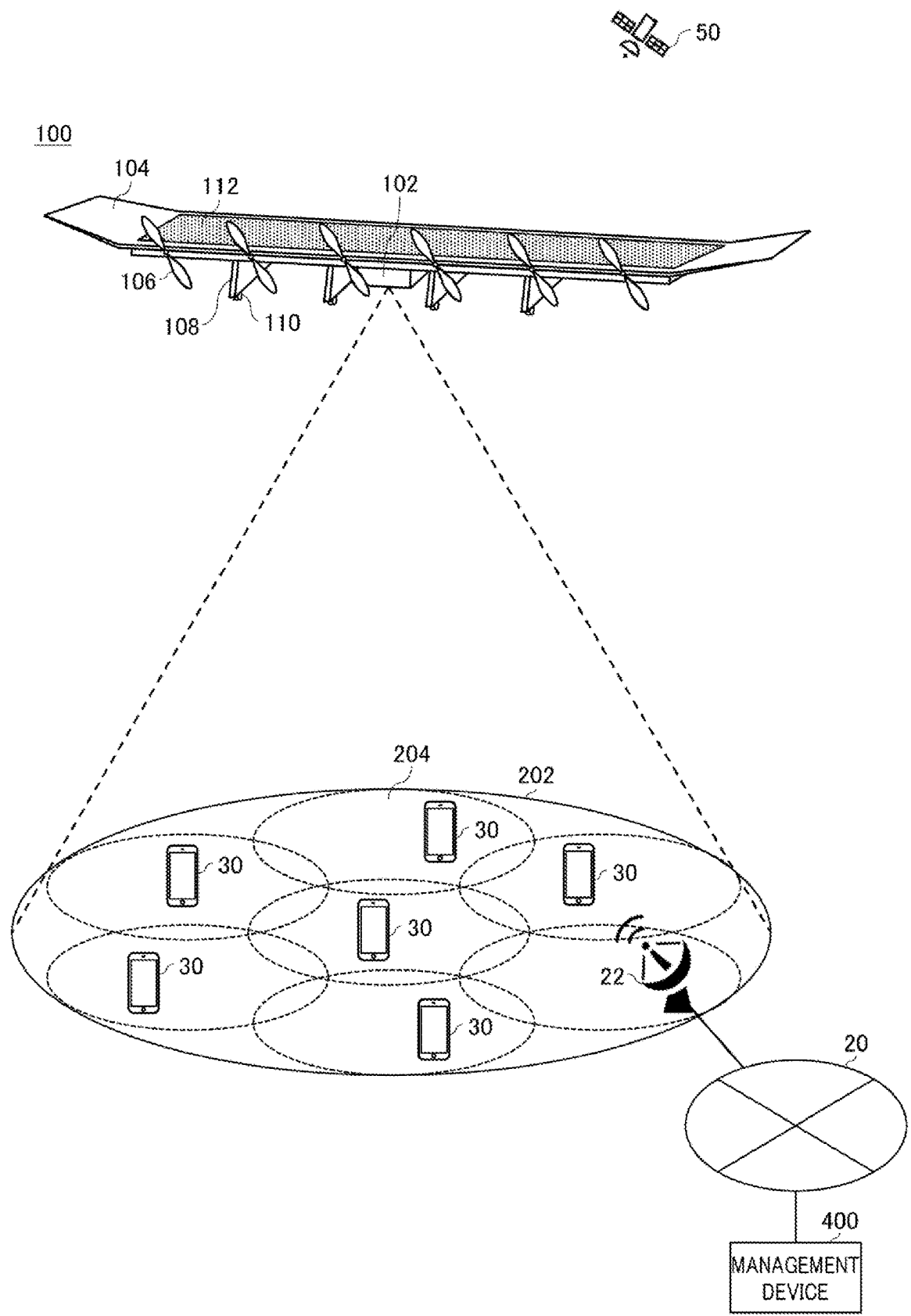
FIG. 1 schematically illustrates an example of a flying object 100.

FIG. 1 schematically illustrates an example of a flying object 100. The flying object 100 includes a body part 102, a main wing part 104, a propeller 106, a skid 108, a wheel 110, and a solar cell panel 112.

The body part 102 includes a battery (not illustrated), a flying control device, and a base station device. The battery stores power generated by the solar cell panel 112. The flying control device controls the flight of the flying object 100. For example, the flying control device causes the flying object 100 to fly by rotating the propeller 106 using the power stored in the battery. The base station device includes an antenna for forming a communication area 202 on the ground to provide a radio communication service to a user terminal 30 in the communication area 202. The antenna may be, for example, a multi-beam antenna. The communication area 202 may be configured by a plurality of sub-cells 204. In addition, the communication area 202 may be configured by a single cell. The flying control device and the base station device may be integrated.

The flying object 100 circulates, for example, in the stratosphere to provide the radio communication service to the user terminal 30 on the ground. The flying object 100 may function as a stratosphere platform.

User terminal 30 may be any terminal as long as the terminal is a communication terminal that can communicate with the flying object 100. For example, the user terminal 30 is a portable phone such as a smart phone. The user terminal 30 may be a tablet terminal, a PC (Personal Computer), or the like. The user terminal 30 may be a so-called IoT (Internet of Thing) device. As the IoT device, various sensors and various actuators can be exemplified. The user terminal 30 may be a communication module that is mounted on a vehicle, ship, drone, or the like. The user terminal 30 may include anything corresponding to a so-called IoE (Internet of Everything).

The flying object 100 covers, for example, a ground area to be covered by means of the communication area 202 while circulating over the ground area. It may be described as a fixed point flight that the flying object 100 turns over the ground area. In addition, the flying object 100 moves, for example, over the ground area while covering a part of the ground area to be covered by means of the communication area 202 so as to cover the entire ground area.

The flying object 100 relays communication between, for example, the user terminal 30 and a network 20 on the ground to provide the radio communication service to the user terminal 30. The network 20 may be any network and, for example, may include at least any of the Internet, a portable phone network such as so-called 3G (3rd Generation), LTE (Long Term Evolution), 4G (4th Generation), and 5G (5th Generation), a public wireless LAN (Local Area Network), and a dedicated network.

The flying object 100 communicates with, for example, the network 20 on the ground via a gateway 22 in the communication area 202 among gateways 22 arranged in various places on the ground. In addition, the flying object 100 communicates with the network 20 on the ground via, for example, a communication satellite 50. In this case, the flying object 100 includes an antenna for communicating with the communication satellite 50.

In addition, the flying object 100 communicates with other flying objects. The flying object 100 communicates with other flying objects via, for example, the network 20. In addition, the flying object 100 communicates with other flying objects via, for example, the communication satellite 50. The flying object 100 may wirelessly communicate with other flying objects. The flying object 100 may directly communicate with other flying objects by wireless communication. In this case, the flying object 100 includes an antenna for wireless communication with other flying objects. The flying object 100 may form, for example, a C2 link with other flying objects using the antenna, and make communication the other flying objects via the C2 link.

The flying object 100 may be controlled by a management device 400 on the ground. The flying object 100 flies, for example, according to an instruction transmitted by the management device 400 via the network 20 and the gateway 22, and forms the communication area 202. The management device 400 may transmit an instruction to the flying object 100 via the communication satellite 50.

The management device 400 controls the flying object 100 by transmitting an instruction. The management device 400 may make the flying object 100 fly over a target area in order to cover the target area on the ground by the communication area 202. The management device 400 may cover each of a plurality of target areas by making the flying object 100 fly over each of the plurality of target areas.

The management device 400 may manage ground area-related information which is related to the ground area covered by the flying object 100 by the communication area 202. The ground area-related information may include, for example, the occurrence situation of a disaster in the ground area. The ground area-related information may include location information of a disaster-stricken area. The ground area-related information may include a layout situation of a ground mobile network in the ground area. The management device 400 may transmit the ground area-related information to the flying object 100.

In addition, the management device 400 may manage user terminal-related information which is related to the user terminal 30. The management device 400 may manage the user terminal-related information of a plurality of user terminals 30. The user terminal-related information may include contract information between the user of the user terminal 30 and a communication carrier which provides the radio communication service to the user. The management device 400 may receive the contract information from a core network of the communication carrier. In addition, the user terminal-related information may include information of an application which is executed in the user terminal 30. The management device 400 may acquire the information of the application which is executed in the user terminal 30 from the core network of the communication carrier. In addition, the user terminal-related information may include whether the user terminal 30 is a high priority user terminal 30. The high priority user terminal 30 may be a user terminal 30 which is predetermined as a maintenance terminal such as a user terminal 30 for infrastructure. The management device 400 may transmit the user terminal-related information to the flying object 100.

When forming the communication area 202 from the sky as in the flying object 100 according to this embodiment, the area coverage is extremely wide compared to the ground mobile network. Therefore, the number of user terminals 30 to be accommodated is large, and congestion of the number of connected terminals is likely to occur in the base station device. The number of connected terminals may be referred to as CU (Connected User) number. According to the conventional base station device, when the CU number exceeds a preset threshold, it is determined as congestion, and admission control starts to limit user access. However, in a crowded state immediately before congestion in which the admission control starts, the user terminal that can be connected may be biased, and the connection quality may be poor in some user terminals.

On the other hand, the flying object 100 according to this embodiment controls to identify and make the user terminals into groups in the state immediately before congestion, and give the user terminals 30 belonging to the groups connection rights in a round-robin order of groups. Thereby, the connection rate can be leveled.

Figure 2:
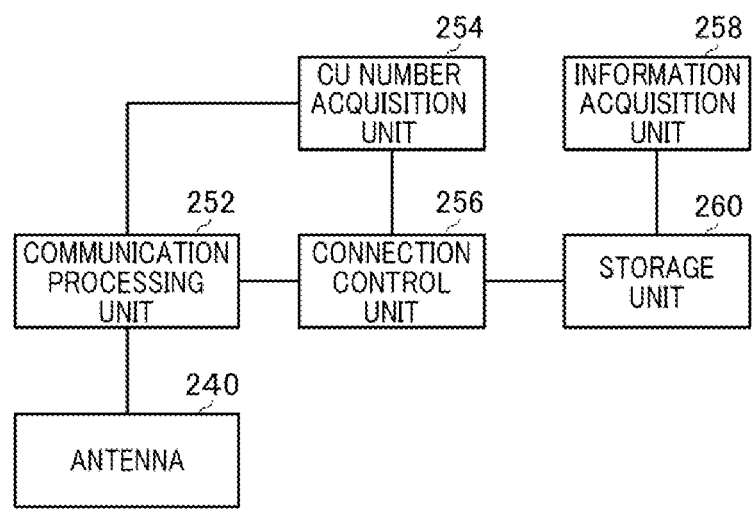
FIG. 2 schematically illustrates an example of the functional configuration of a base station device 200.

FIG. 2 schematically illustrates an example of the functional configuration of a base station device 200. The base station device 200 includes a communication processing unit 252, a CU number acquisition unit 254, a connection control unit 256, an information acquisition unit 258, and a storage unit 260. Further, it is not necessarily essential that the base station device 200 includes all of these configurations.

The communication processing unit 252 executes various communication processes. The communication processing unit 252 forms the communication area 202 on the ground using an antenna 240. The communication processing unit 252 may communicate with the network 20 via the gateway 22 in the communication area 202. The communication processing unit 252 communicates with, for example, the management device 400 via the gateway 22 and the network 20. In addition, the communication processing unit 252 establishes communication connection with the user terminal 30 in the communication area 202 to communicate with the user terminal 30. The communication processing unit 252 may relay the communication of the user terminal 30 which established the communication connection. If the flying object 100 includes an antenna for communicating with the communication satellite 50, the communication processing unit 252 may communicate with the communication satellite 50 using the antenna.

The CU number acquisition unit 254 acquires the CU number which is the number of user terminals 30 for which the flying object 100 has established the communication connection. The CU number acquisition unit 254 may acquire the CU number from the communication processing unit 252.

The connection control unit 256 controls a process of the communication processing unit 252 for connecting the user terminal 30 based on the CU number acquired by the CU number acquisition unit 254. When the CU number is larger than a preset first threshold, the connection control unit 256 performs admission control in response to a connection request received from the user terminal 30 in the communication area 202. In addition, when the CU number is smaller than the first threshold and larger than a second threshold smaller than the first threshold, the connection control unit 256 periodically selects a connection allowable group which is allowed for connection from the plurality of groups of the user terminals 30, executes a connection establishment process in response to the connection request from the user terminal 30 included in the connection allowable group, and executes a request rejection process that rejects the connection request from the user terminal 30 included in a group other than the connection allowable group.

The admission control may be, for example, admission control in 3GPP. The admission control is, for example, a control in which the connection establishment process in response to the connection request from the user terminal 30 is executed with a connection allowable number which is less than the connection allowable number per unit time in a case where the CU number is smaller than the second threshold. As a specific example, the connection control unit 256 sets the connection allowable number to 1 access/second when the CU number is larger than the first threshold. In addition, the admission control may be a control that rejects the connection request received from the user terminal 30 in the communication area 202.

The plurality of groups of the user terminals 30 are determined, for example, based on identifiers assigned to the user terminals 30. A specific example of the identifier includes S-TMISI contained in MSG3 (RRC Connection Request) which is transmitted from the user terminal 30 in a random access sequence. The connection allowable group is calculated (Mod m) by S-TMISI. The connection allowable group is updated periodically. Further, the identifier used is not limited to above, and may be any such as IMEI (International Mobile Equipment Identifier) and IMSI (International Mobile Subscriber Identity) as long as it can identify the user terminal 30.

The connection control unit 256 may change the number of groups according to the degree of congestion of the radio communication service in the communication processing unit 252. For example, the connection control unit 256 reduces the number of groups as the degree of congestion is lower. Thereby, when the degree of congestion is low compared to the case where the degree of congestion is high, each of the plurality of user terminals 30 can be given more opportunities for connection.

The information acquisition unit 258 acquires various information. The information acquisition unit 258 may acquire the ground area-related information from the management device 400. In addition, the information acquisition unit 258 may acquire the user terminal-related information from the management device 400. The information acquisition unit 258 may store the acquired information in the storage unit 260.

The connection control unit 256 may include the high priority user terminal 30 among the plurality of user terminals 30 in the communication area 202 into the plurality of groups. For example, if the number of groups is five, the connection control unit 256 includes the high priority user terminal 30 to three groups. Thereby, the opportunity for connection can be increased from ⅕ to ⅗. The connection control unit 256 may include the high priority user terminal 30 among the plurality of user terminals 30 in the communication area 202 into all of the plurality of groups.

The high priority user terminal 30 is, for example, a user terminal 30 that issues an emergency call. The connection control unit 256 may determine whether the user terminal 30 issues the emergency call by referring to the connection request which is received by the communication processing unit 252 from the user terminal 30. In addition, the high priority user terminal 30 may be a user terminal 30 which is predetermined as a maintenance terminal such as a user terminal 30 for infrastructure. The connection control unit 256 may determine whether the user terminal 30 is the maintenance terminal by referring to the user terminal-related information which is stored in the storage unit 260.

The plurality of groups of the user terminals 30 may be groups having terminal types different from each other. For example, the plurality of groups include a first group and a second group which have terminal types different from each other. Examples of the first group and the second group include a general user group and an IoT device group. The connection control unit 256 selects the second group as the connection allowable group, for example, at a rate greater than the rate of selecting the first group as the connection allowable group. The connection control unit 256 may, for example, identify whether the user terminal 30 is a general user or an IoT device based on a difference in RAT (Radio Access Technology) between NB (Narrow Band)-IoT and LTE. In addition, when the IoT device uses eMTC (enhanced Machine Type Communication), the connection control unit 256 may identify whether the user terminal 30 is a general user or an IoT device based on a difference in UE categories.

The plurality of groups of the user terminals 30 may include a data communication group which performs data communication in the radio communication service according to the communication area 202 and a voice call group which performs voice calls in the radio communication service. If the radio communication service complies with LTE, the voice call is a so-called VoLTE (Voice over LTE). The connection control unit 256 may select the voice call group as the connection allowable group at a rate greater than the rate of selecting the data communication group as the connection allowable group. Thereby, the opportunity for connection can be given preferentially to the user terminal 30 that executes a voice call.

The plurality of groups of the user terminals 30 may include a first group which is a group of the user terminals located in a disaster-stricken area and a second group which is a group of the user terminals located in a location other than the disaster-stricken area. The connection control unit 256 may determine whether the user terminal 30 is included in the first group or the second group by referring to the ground area-related information stored in the storage unit 260. The connection control unit 256 may select the first group as the connection allowable group at a rate greater than the rate of selecting the second group as the connection allowable group. Thereby, the opportunity for connection can be given preferentially to the user terminal located in the disaster-stricken area.

The plurality of groups of the user terminals 30 may include a first group which is a group of the user terminals located outside the communication area of a wireless base station installed on the ground, and a second group which is a group of the user terminals located in the communication area of the wireless base station installed on the ground. The connection control unit 256 may determine whether the user terminal 30 is included in the first group or the second group by referring to the ground area-related information stored in the storage unit 260. The connection control unit 256 may select the first group as the connection allowable group at a rate greater than the rate of selecting the second group as the connection allowable group. Thereby, the opportunity for connection can be given preferentially to the user terminal 30 located in the communication area of the wireless base station installed on the ground. Thereby, more user terminals 30 can use the radio communication service.

The plurality of groups of the user terminals 30 may include a first group which is a group of the user terminals running a first type of application and a second group which is a group of the user terminals running a second type of application. The connection control unit 256 may determine whether the user terminal 30 is included in the first group or the second group by referring to the user terminal-related information stored in the storage unit 260. In addition, the connection control unit 256 may determine whether the user terminal 30 is included in the first group or the second group by referring to the data of the user terminal 30 to be relayed by the communication processing unit 252. The connection control unit 256 may select the first group as the connection allowable group at a rate greater than the rate of selecting the second group as the connection allowable group. Examples of the first type of application include a disaster prevention application, a voice call application, and the like. Thereby, the opportunity for connection can be given preferentially to the user terminal 30 that executes a specific application.

The plurality of groups of the user terminals 30 may be groups having contract contents different from each other. For example, when it is possible to make a contract in which the radio communication service by the flying object 100 can be preferentially available, the plurality of groups may include a first group of the user terminals 30 having the contract and a second group not having the contract. The connection control unit 256 may determine whether the user terminal 30 is included in the first group or the second group by referring to the user terminal-related information stored in the storage unit 260. The connection control unit 256 may select the first group as the connection allowable group at a rate greater than the rate of selecting the second group as the connection allowable group.

Figure 3:
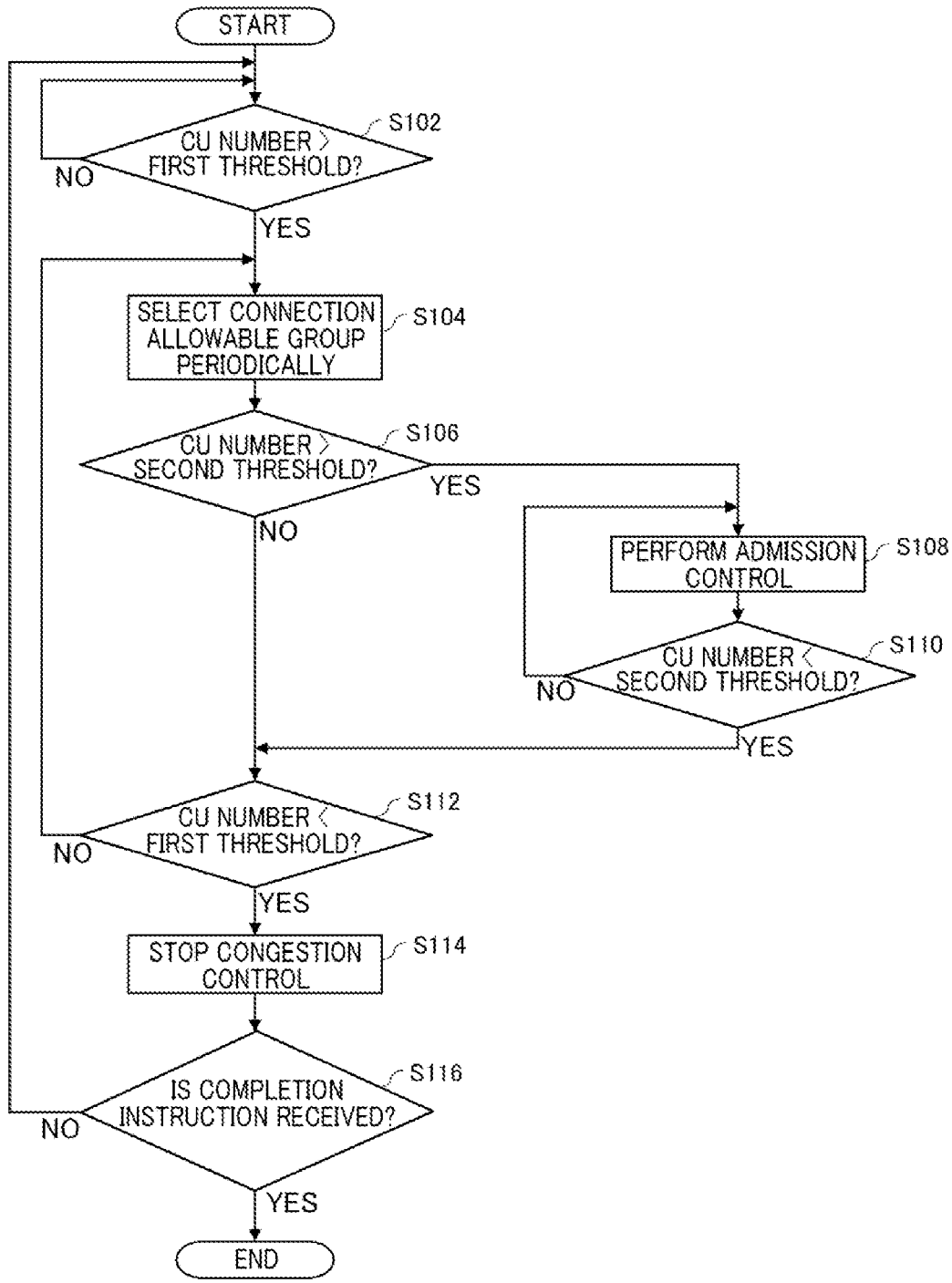
FIG. 3 schematically illustrates an example of the processing flow of the base station device 200.

FIG. 3 schematically illustrates an example of the processing flow of the base station device 200. Here, the state in which the CU number is smaller than the first threshold and the congestion control is not performed will be described as the starting state.

In Step (Step may be abbreviated as S) 102, the connection control unit 256 determines whether the CU number acquired by the CU number acquisition unit 254 is larger than the first threshold. The CU number acquisition unit 254 continuously acquires the CU number. The CU number acquisition unit 254 acquires, for example, the CU number according to a preset period. When it is determined that the CU number is larger, the process proceeds to S104.

In S104, the connection control unit 256 periodically selects the connection allowable group from the plurality of groups of the user terminals 30. The connection control unit 256 executes the connection establishment process in response to the connection request from the user terminal 30 included in the connection allowable group, and executes the request rejection process that rejects the connection request from the user terminal 30 not included in the connection allowable group.

In S106, the connection control unit 256 determines whether the CU number newly acquired by the CU number acquisition unit 254 is larger than a second threshold. When it is determined that the CU number is larger, the process proceeds to S108. When it is determined that the CU number is not larger, the process proceeds to S110.

In S108, the connection control unit 256 performs the admission control. In S110, the connection control unit 256 determines whether the CU number newly acquired by the CU number acquisition unit 254 is smaller than the second threshold. When it is determined that the CU number is not smaller, the process returns to S108. When it is determined that the CU number is smaller, the process proceeds to S112.

In S112, the connection control unit 256 determines whether the CU number newly acquired by the CU number acquisition unit 254 is smaller than the first threshold. When it is determined that the CU number is not smaller, the process returns to S104. When it is determined that the CU number is smaller, the process proceeds to S114. In S114, the connection control unit 256 stops the congestion control.

In S116, the connection control unit 256 determines whether the completion instruction is received. When it is determined that the completion instruction is not received, the process returns to S102. When it is determined that the process is completed, the process ends.

Figure 4:
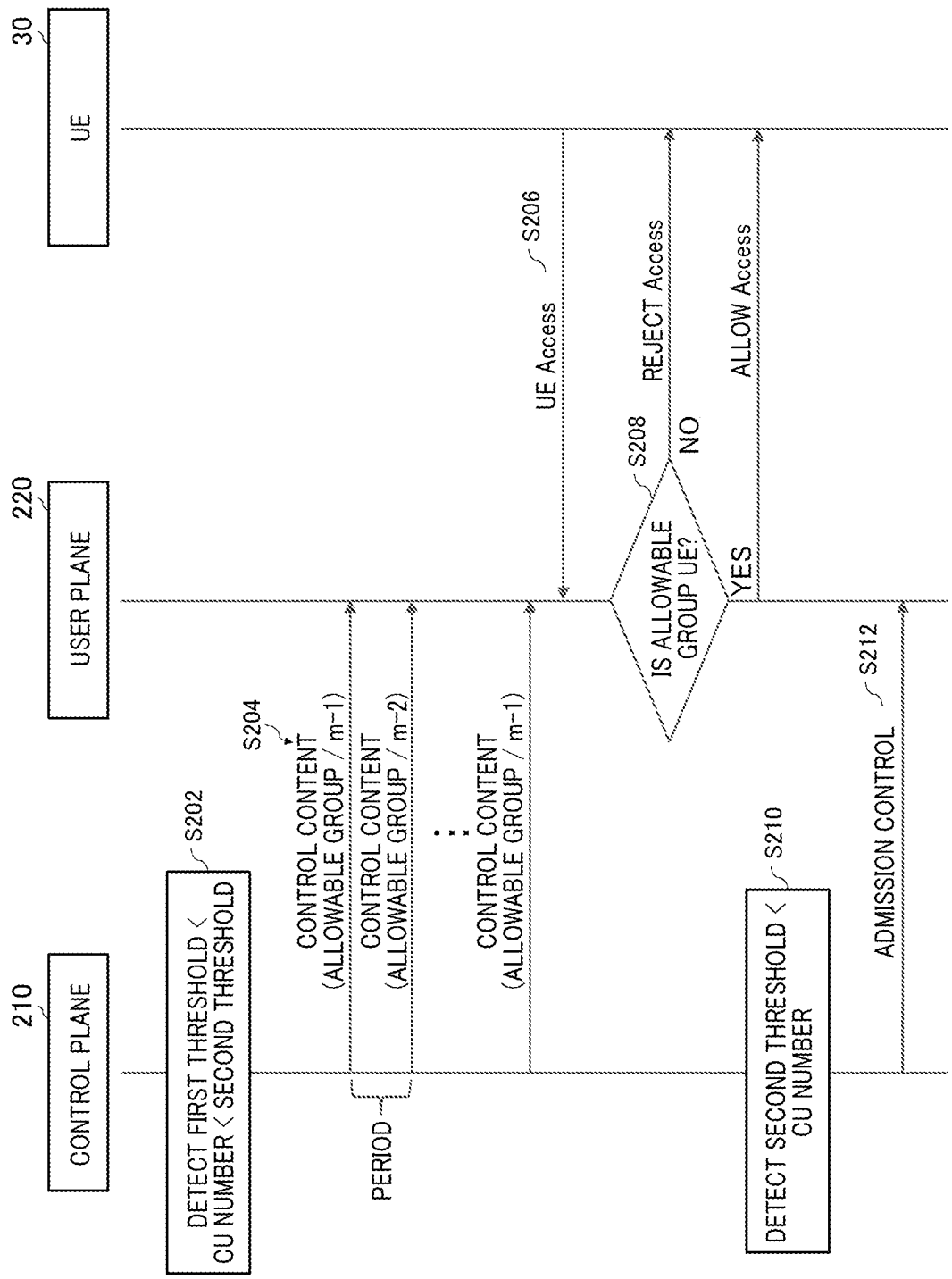
FIG. 4 schematically illustrates an example of the processing flow of the base station device 200.

FIG. 4 schematically illustrates an example of the processing flow of the base station device 200. Here, the processing flow of a control plane 210 and a user plane 220 in the base station device 200 will be described. Further, the state in which the CU number is smaller than the first threshold and the congestion control is not performed will be described as the starting state.

In S202, the control plane 210 detects that the CU number is larger than the first threshold and smaller than the second threshold. In S204, the control plane 210 periodically selects the connection allowable group from the plurality of groups of the user terminals 30, and transmits the control contents related to the selected connection allowable group to the user plane 220. The user plane 220 is periodically notified of the connection allowable group.

In S206, the user plane 220 accepts an access from a UE. In S208, the user plane 220 determines whether the user terminal 30 is included in the connection allowable group by referring to the information of the connection allowable group received from the control plane 210. When it is determined that the user terminal 30 is not included in the connection allowable group, the access is rejected. When it is determined that the user terminal 30 is included in the connection allowable group, the access is allowed.

In S210, the control plane 210 detects that the CU number is larger than the second threshold. In S212, the control plane 210 instructs the user plane 220 to perform the admission control.

Figure 5:
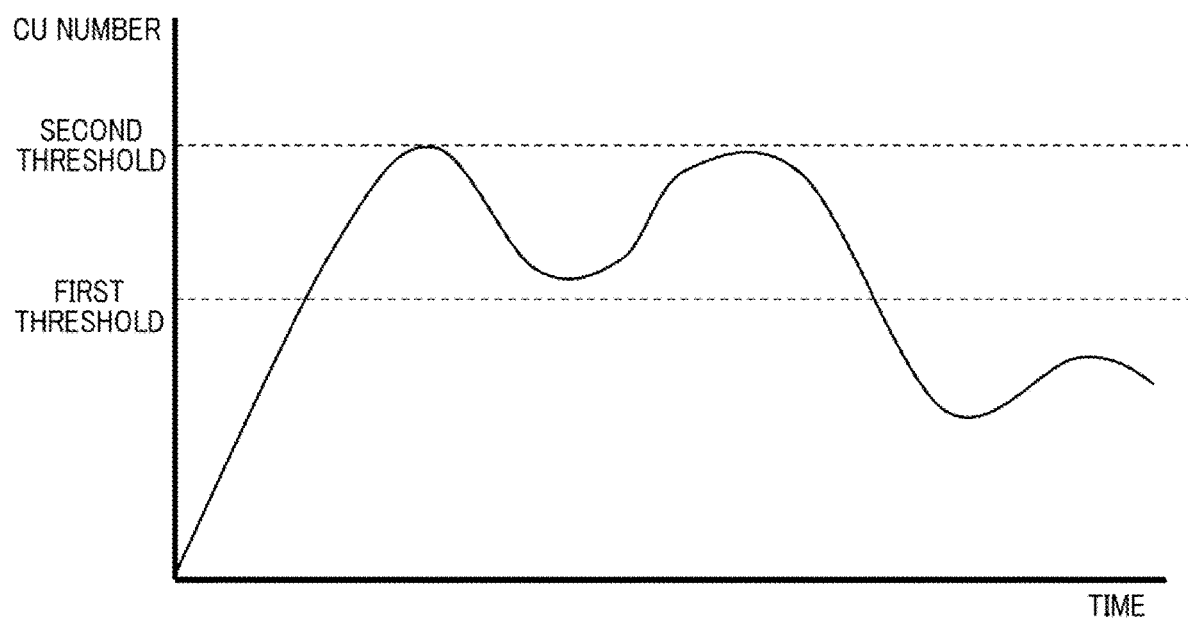
FIG. 5 schematically illustrates an example of variation in CU number.

FIG. 5 schematically illustrates an example of variation in CU number. According to the base station device 200 of this embodiment, when the CU number is larger than the first threshold, the connection allowable group is periodically selected, and the user terminal 30 which is connectable is limited to a user terminal 30 included in the connection allowable group. Thereby, as illustrated in FIG. 5, the increase in CU number can be suppressed, and the occurrence of a situation that the CU number exceeds the second threshold can be suppressed.

In the above embodiment, the description has been given about an example when the base station device 200 independently performs the congestion control based on the CU number, but the invention is not limited thereto. The congestion control of the base station device 200 may be managed by a control device other than the base station device 200 such as a flying control device which is mounted on the flying object 100.

Figure 6:
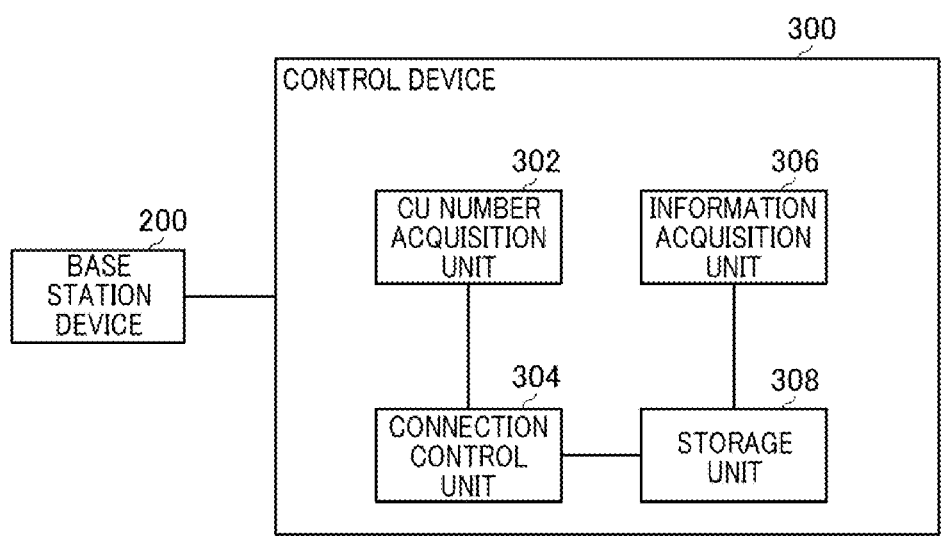
FIG. 6 schematically illustrates an example of the functional configuration of a control device 300.

FIG. 6 schematically illustrates an example of the functional configuration of a control device 300 which performs congestion control of the base station device 200. The configuration illustrated in FIG. 6 may be a part of the flying control device. In addition, the control device 300 illustrated in FIG. 6 may be mounted on the flying object 100 separately from the flying control device.

The control device 300 includes a CU number acquisition unit 302, a connection control unit 304, an information acquisition unit 306, and a storage unit 308. Here, the description will be mainly given about the differences from the CU number acquisition unit 254, the connection control unit 256, the information acquisition unit 258, and the storage unit 260.

The CU number acquisition unit 302 acquires the CU number which is the number of user terminals 30 for which the base station device has established the communication connection. The CU number acquisition unit 302 may acquire the CU number from the base station device.

The connection control unit 304 controls a connecting process executed by the base station device for connection with the user terminal 30 based on the CU number acquired by the CU number acquisition unit 302. When the CU number is larger than a preset first threshold, the connection control unit 304 causes the base station device 200 to perform admission control in response to a connection request received from the user terminal 30 in the communication area 202. In addition, when the CU number is less than the first threshold and larger than a second threshold smaller than the first threshold, the connection control unit 304 periodically selects a connection allowable group which is allowed for connection from the plurality of groups of the user terminals 30, and makes the base station device 200 to execute a connection establishment process in response to the connection request from the user terminal 30 included in the connection allowable group, and to execute a request rejection process that rejects the connection request from the user terminal 30 included in a group other than the connection allowable group.

The connection control unit 304 may change the number of groups according to the degree of congestion of the radio communication service in the base station device. For example, the connection control unit 304 reduces the number of groups as the degree of congestion is lower.

The information acquisition unit 306 acquires various information. The information acquisition unit 306 may acquire the ground area-related information from the management device 400. In addition, the information acquisition unit 306 may acquire the user terminal-related information from the management device 400. The information acquisition unit 306 may store the acquired information in the storage unit 308.

The connection control unit 304 may include the high priority user terminal 30 among the plurality of user terminals 30 in the communication area 202 into the plurality of groups. The connection control unit 304 may include the high priority user terminal 30 among the plurality of user terminals 30 in the communication area 202 into all of the plurality of groups.

The plurality of groups of the user terminals 30 may be groups having terminal types different from each other. For example, the plurality of groups include a first group and a second group which have terminal types different from each other. The connection control unit 304 selects the second group as the connection allowable group, for example, at a rate greater than the rate of selecting the first group as the connection allowable group.

The plurality of groups of the user terminals 30 may include a data communication group which performs data communication in the radio communication service according to the communication area 202 and a voice call group which performs voice calls in the radio communication service. The connection control unit 304 may select the voice call group as the connection allowable group at a rate greater than the rate of selecting the data communication group as the connection allowable group.

The plurality of groups of the user terminals 30 may include a first group which is a group of the user terminals located in a disaster-stricken area and a second group which is a group of the user terminals located in a location other than the disaster-stricken area. The connection control unit 304 may determine whether the user terminal 30 is included in the first group or the second group by referring to the ground area-related information stored in the storage unit 308. The connection control unit 256 may select the first group as the connection allowable group at a rate greater than the rate of selecting the second group as the connection allowable group.

The plurality of groups of the user terminals 30 may include a first group which is a group of the user terminals located outside the communication area of a wireless base station installed on the ground, and a second group which is a group of the user terminals located in the communication area of the wireless base station installed on the ground. The connection control unit 304 may determine whether the user terminal 30 is included in the first group or the second group by referring to the ground area-related information stored in the storage unit 308. The connection control unit 304 may select the first group as the connection allowable group at a rate greater than the rate of selecting the second group as the connection allowable group.

The plurality of groups of the user terminals 30 may include a first group which is a group of the user terminals running a first type of application and a second group which is a group of the user terminals running a second type of application. The connection control unit 304 may determine whether the user terminal 30 is included in the first group or the second group by referring to the user terminal-related information stored in the storage unit 308. In addition, the connection control unit 304 may determine whether the user terminal 30 is included in the first group or the second group by referring to the data of the user terminal 30 to be relayed by the base station device 200. The connection control unit 304 may select the first group as the connection allowable group at a rate greater than the rate of selecting the second group as the connection allowable group.

The plurality of groups of the user terminals 30 may be groups having contract contents different from each other. For example, when it is possible to make a contract in which the radio communication service by the flying object 100 can be preferentially available, the plurality of groups may include a first group of the user terminals 30 having the contract and a second group not having the contract. The connection control unit 304 may determine whether the user terminal 30 is included in the first group or the second group by referring to the user terminal-related information stored in the storage unit 308. The connection control unit 304 may select the first group as the connection allowable group at a rate greater than the rate of selecting the second group as the connection allowable group.

Figure 7:
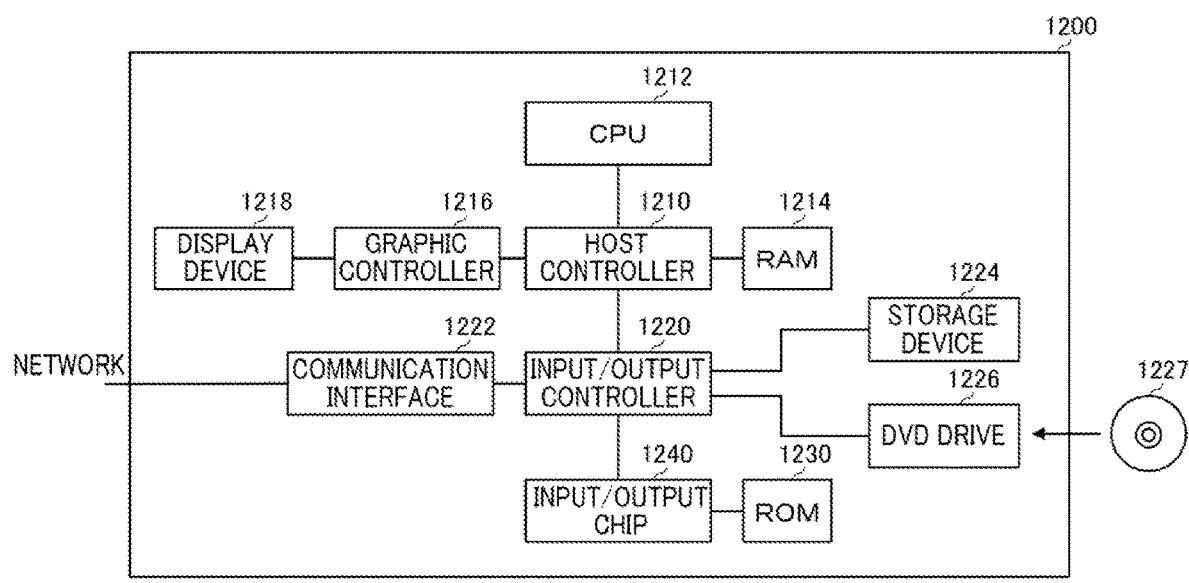
FIG. 7 schematically illustrates an example of the hardware configuration of the computer 1200 which functions as the base station device 200 or the control device 300.

FIG. 7 schematically illustrates an example of the hardware configuration of the computer 1200 which functions as the base station device 200 or the control device 300. A program installed in the computer 1200 can cause the computer 1200 to function as one or more "units" of the device according to the embodiments of the invention, or can cause the computer 1200 to execute the operations or one or more "units" related to the device according to the embodiments of the invention, and/or can cause the computer 1200 to execute the process or steps of the process related to the embodiments of the invention. Such a program may be executed by a CPU 1212 in order to cause the computer 1200 to execute a specific operation related to some or all of the blocks of the flowcharts and the block diagrams described in this specification.

The computer 1200 according to this embodiment includes a CPU 1212, a RAM 1214, and a graphic controller 1216, which are interconnected by a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, or the like. The storage device 1224 may be a hard disk drive, a solid state drive, or the like. The computer 1200 also includes a ROM 1230 and an input/output unit such as a legacy keyboard, which are connected to the input/output controller 1220 via an input/output chip 1240.

The CPU 1212 operates according to a program stored in the ROM 1230 and the RAM 1214, and controls each unit by the program. The graphic controller 1216 acquires image data generated by the CPU 1212 in a frame buffer or the like provided in the RAM 1214 or in itself, and displays the image data on a display device 1218.

The communication interface 1222 communicates with other electronic devices over a network. The storage device 1224 stores a program and data used by the CPU 1212 in the computer 1200. The DVD drive 1226 reads the program or data from a DVD-ROM 1227 or the like, and provides it to the storage device 1224. The IC card drive reads the program and data from an IC card, and/or writes the program and data in the IC card.

The ROM 1230 stores in itself a boot program or the like executed by the computer 1200 when activated, and/or a program that depends on the hardware of the computer 1200. The input/output chip 1240 may also connect various input/output units to the input/output controller 1220 via a USB port, parallel port, serial port, keyboard port, mouse port, or the like.

The program is provided by a computer-readable medium such as the DVD-ROM 1227 or an IC card. The program is read from the computer-readable medium, installed in the storage device 1224, the RAM 1214, or the ROM 1230 which is also an example of the computer-readable medium, and executed by the CPU 1212. The information processing described in these programs is read on the computer 1200, resulting in cooperation between the program and the various types of hardware resources described above. The device or method may be configured by realizing the operation or processing of information according to the use of the computer 1200.

For example, when communication is performed between the computer 1200 and an external device, the CPU 1212 executes a communication program loaded into the RAM 1214 and may command the communication interface 1222 to perform communication processing based on the processing described in the communication program. Under the control of the CPU 1212, the communication interface 1222 reads transmission data stored in a transmission buffer region provided in a recording medium such as the RAM 1214, the storage device 1224, the DVD-ROM 1227, or the IC card, transmits the read transmission data to the network, or writes the reception data received from the network in a reception buffer region provided on the recording medium.

In addition, the CPU 1212 sets all or necessary portions of files or database stored in an external recording medium such as the storage device 1224, the DVD drive 1226 (the DVD-ROM 1227), the IC card, or the like on the RAM 1214, and may perform various types of processing on the data on the RAM 1214. The CPU 1212 then may write back the processed data to the external recording medium.

Various types of information, such as various types of programs, data, tables, and databases, may be stored in the recording medium and processed. The CPU 1212 may perform various types of processing on data read from the RAM 1214, the various types of processing including various types of operations, information processing, conditional determination, conditional branching, unconditional branching, information search/replacement, etc., which are described throughout the present disclosure and designated by an instruction sequence of the program, and the results may be written back to the RAM 1214. In addition, the CPU 1212 may search for information in a file, database, or the like in the recording medium. For example, in a case where a plurality of entries with attribute values for a first attribute associated with an attribute value of a second attribute are stored in the recording medium, the CPU 1212 searches an entry that is matched with the condition among the plurality of entries, where the attribute value of the first attribute is specified, reads the attribute value of the second attribute stored in the entry, thereby the attribute value of the second attribute associated with the first attribute that satisfies the predetermined condition may be obtained.

The program or software module described above may be stored on the computer 1200 or in a computer-readable recording medium near the computer 1200. Further, a recording medium such as a hard disk or RAM provided in a dedicated communication network or a server system connected to the Internet can be used as a computer-readable recording medium, thereby providing a program to the computer 1200 via a network.

The blocks in the flowchart and block diagrams in this embodiment may represent the stages of a process in which the operation is performed or "units" of the device which has the role of performing the operation. The specific step and "unit" may be mounted on a dedicated circuit, a programmable circuit which is supplied together with a computer-readable instruction stored on a computer-readable recording medium, and/or a processor which is supplied together with a computer-readable instruction stored on the computer-readable recording medium. The dedicated circuit may include a digital and/or analog hardware circuit, or may include an integrated circuit (IC) and/or a discrete circuit. The programmable circuit may include, for example, a reconfigurable hardware circuit such as a field programmable gate array (FPGA), a programmable logic array (PLA), and the like, which includes a logical AND, a logical OR, a logical XOR, a logical NAND, a logical NOR, other logical operations, flip-flops, registers, and memory elements.

The computer-readable recording medium may include any tangible device that can store instructions executed by the appropriate device, and as a result, the computer-readable recording medium having instructions stored therein comprises a product including an instruction that can be executed to create a means for performing the operation designated in a flowchart or block diagram. Examples of the computer-readable recording medium may include electronic storage medium, magnetic storage medium, optical storage medium, electromagnetic storage medium, semiconductor storage medium, and the like. More specific examples of the computer-readable recording medium may include floppy (registered trademark) disks, diskettes, hard disks, random access memories (RAM), read-only memories (ROM), erasable programmable read-only memories (EPROM or flash memory), electrically erasable programmable read-only memories (EEPROM), static random access memories (SRAM), compact disk read-only memories (CD-ROM), digital versatile disks (DVD), Blu-ray (registered trademark) disks, memory sticks, integrated circuit cards, and the like.

The computer-readable instructions may include either source code or object code written in any combination of one or more programming languages, including assembler instructions, instruction set architecture (ISA) instructions, machine instructions, machine-dependent instructions, microcode, firmware instructions, state setting data, or object-oriented programming languages such as Smalltalk, JAVA (registered trademark), C++, etc., and traditional procedural programming languages such as "C" programming languages or similar programming languages.

The computer-readable instruction may be provided to general-purpose computer, special purpose computers, other programmable data processors, or programmable circuits locally or over a wide area network (WAN) such as a local area network (LAN), the Internet, etc., in order for general purpose computers, special purpose computers, other programmable data processors, or programmable circuits to execute the computer-readable instruction so as to generate means for executing an operation specified in a flowchart or a block diagram. Examples of processors include computer processors, processing units, microprocessors, digital signal processors, controllers, microcontrollers, and the like.

While the embodiments of the present invention have been described, the technical scope of the invention is not limited to the above described embodiments. It is apparent to persons skilled in the art that various alterations and improvements can be added to the above-described embodiments. It is apparent from the description of the appended claims that embodiments with such changes or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described using phrases such as "first" or "next" in the claims, embodiments, or diagrams, it does not necessarily mean that the process must be performed in this order.

EXPLANATION OF REFERENCES 20 network
22 gateway
30 user terminal
50 communication satellite
100 flying object
102 main part
104 main wing part
106 propeller
108 skid
110 wheel
112 solar cell panel
200 base station device
202 communication area
204 sub-cell
210 control plane
220 user plane
252 communication processing unit
254 CU number acquisition unit
256 connection control unit
258 information acquisition unit
260 storage unit
300 control device
302 CU number acquisition unit
304 connection control unit
306 information acquisition unit
308 storage unit
400 management device
1200 computer
1210 host controller
1212 CPU
1214 RAM
1216 graphic controller
1218 display device
1220 input/output controller
1222 communication interface
1224 storage device
1226 DVD drive
1227 DVD-ROM
1230 ROM
1240 input/output chip

What is claimed is:

1. A base station device that is mounted on a flying object, forms a communication area on a ground, establishes a communication connection with a user terminal in the communication area, and provides a radio communication service to the user terminal, comprising:
    a connected terminal number acquisition unit that acquires the number of connected terminals which is a number of user terminals with which the base station device establishes the communication connection; and
    a connection control unit that, in a case where the number of connected terminals is larger than a first threshold, performs admission control in response to a connection request received from the user terminal in the communication area, and in a case where the number of connected terminals is smaller than the first threshold and larger than a second threshold smaller than the first threshold, periodically selects a connection allowable group that allows connection from a plurality of groups of the user terminals, executes a connection establishment process in response to a connection request from a user terminal included in the connection allowable group, and executes a request rejection process that rejects a connection request from a user terminal not included in the connection allowable group.

2. The base station device according to claim 1, wherein, in a case where the number of connected terminals is larger than the first threshold, the connection control unit executes a connection establishment process in response to a connection request from the user terminal at a connection allowable number smaller than a connection allowable number per unit time in a case where the number of connected terminals is smaller than the second threshold.

3. The base station device according to claim 2, wherein, in a case where the number of connected terminals is larger than the first threshold, the connection control unit executes a request rejection process that rejects a connection request received from a user terminal in the communication area.

4. The base station device according to claim 1, wherein the plurality of groups are determined based on identifiers assigned to the user terminals.

5. The base station device according to claim 2, wherein the plurality of groups are determined based on identifiers assigned to the user terminals.

6. The base station device according to claim 1, wherein the connection control unit changes the number of the plurality of groups according to a degree of congestion of the radio communication service in the base station device.

7. The base station device according to claim 2, wherein the connection control unit changes the number of the plurality of groups according to a degree of congestion of the radio communication service in the base station device.

8. The base station device according to claim 1,
wherein the connection control unit includes a high priority user terminal among the plurality of user terminals in the communication area into all of the plurality of groups.

9. The base station device according to claim 2,
wherein the connection control unit includes a high priority user terminal among the plurality of user terminals in the communication area into all of the plurality of groups.

10. The base station device according to claim 1,
wherein the plurality of groups include a first terminal group and a second terminal group which have terminal types different from each other, and
wherein the connection control unit selects the second terminal group as the connection allowable group at a rate greater than a rate of selecting the first terminal group as the connection allowable group.

11. The base station device according to claim 2,
wherein the plurality of groups include a first terminal group and a second terminal group which have terminal types different from each other, and
wherein the connection control unit selects the second terminal group as the connection allowable group at a rate greater than a rate of selecting the first terminal group as the connection allowable group.

12. The base station device according to claim 1,
wherein the plurality of groups includes a data communication group which performs data communication in the radio communication service, and a voice call group which performs voice calls in the radio communication service, and
wherein the connection control unit selects the voice call group as the connection allowable group at a rate greater than a rate of selecting the data communication group as the connection allowable group.

13. The base station device according to claim 2,
wherein the plurality of groups includes a data communication group which performs data communication in the radio communication service, and a voice call group which performs voice calls in the radio communication service, and
wherein the connection control unit selects the voice call group as the connection allowable group at a rate greater than a rate of selecting the data communication group as the connection allowable group.

14. The base station device according to claim 1,
wherein the plurality of groups includes a first group which is a group of user terminals located in a disaster-stricken area, and a second group which is a group of user terminals located in a place other than the disaster-stricken area, and
wherein the connection control unit selects the first group as the connection allowable group at a rate greater than a rate of selecting the second group as the connection allowable group.

15. The base station device according to claim 1,
wherein the plurality of groups includes a first group which is a group of user terminals located outside a communication area of a wireless base station installed on a ground, and a second group which is a group of user terminals located in the communication area of the wireless base station installed on the ground, and
wherein the connection control unit selects the first group as the connection allowable group at a rate greater than a rate of selecting the second group as the connection allowable group.

16. The base station device according to claim 1,
wherein the plurality of groups includes a first group which is a group of user terminals running a first type of application, and a second group which is a group of user terminals running a second type of application, and
wherein the connection control unit selects the first group as the connection allowable group at a rate greater than a rate of selecting the second group as the connection allowable group.

17. A non-transitory computer-readable storage medium storing a program for causing a computer to function as a base station device that is mounted on a flying object, forms a communication area on a ground, establishes a communication connection with a user terminal in the communication area, and provides a radio communication service to the user terminal,
wherein the base station device comprises:
a connected terminal number acquisition unit that acquires the number of connected terminals which is a number of user terminals with which the base station device establishes the communication connection; and
a connection control unit that, in a case where the number of connected terminals is larger than a first threshold, performs admission control in response to a connection request received from the user terminal in the communication area, and in a case where the number of connected terminals is smaller than the first threshold and larger than a second threshold smaller than the first threshold, periodically selects a connection allowable group that allows connection from a plurality of groups of the user terminals, executes a connection establishment process in response to a connection request from a user terminal included in the connection allowable group, and executes a request rejection process that rejects a connection request from a user terminal not included in the connection allowable group.

18. A control device for controlling a base station device that is mounted on a flying object, forms a communication area on a ground, establishes a communication connection with a user terminal in the communication area, and provides a radio communication service to the user terminal, comprising:
a connected terminal number acquisition unit that acquires the number of connected terminals which is a number of user terminals with which the base station device establishes the communication connection; and
a connection control unit that, in a case where the number of connected terminals is larger than a first threshold, causes the base station device to perform admission control in response to a connection request received from a user terminal in the communication area, and in a case where the number of connected terminals is smaller than the first threshold and larger than a second threshold smaller than the first threshold, periodically selects a connection allowable group that allows connection from a plurality of groups of the user terminals, and causes the base station device to execute a connection establishment process in response to a connection request from a user terminal included in the connection allowable group, and to execute a request rejection process that rejects a connection request from a user terminal included in a group other than the connection allowable group.

19. A non-transitory computer-readable storage medium storing a program for causing a computer to function as a control device for controlling a base station device that is mounted on a flying object, forms a communication area on a ground, establishes a communication connection with a user terminal in the communication area, and provides a radio communication service to the user terminal, wherein the control device comprises:
- a connected terminal number acquisition unit that acquires the number of connected terminals which is a number of user terminals with which the base station device establishes the communication connection; and
- a connection control unit that, in a case where the number of connected terminals is larger than a first threshold, causes the base station device to perform admission control in response to a connection request received from a user terminal in the communication area, and in a case where the number of connected terminals is smaller than the first threshold and larger than a second threshold smaller than the first threshold, periodically selects a connection allowable group that allows connection from a plurality of groups of the user terminals, and causes the base station device to execute a connection establishment process in response to a connection request from a user terminal included in the connection allowable group, and to execute a request rejection process that rejects a connection request from a user terminal included in a group other than the connection allowable group.

20. A control method, comprising:
- a connected terminal number acquiring step to acquire a connected terminal number which is the number of user terminals with which a base station device establishes a communication connection, the base station device being mounted on a flying object, forming a communication area on a ground, establishing the communication connection with a user terminal in the communication area, and providing a radio communication service to the user terminal; and
- a connection control step to execute, in a case where the number of connected terminals is larger than a first threshold, admission control in response to a connection request received from a user terminal in the communication area, to periodically select, in a case where the number of connected terminals is smaller than the first threshold and larger than a second threshold smaller than the first threshold, a connection allowable group that allows connection from a plurality of groups of the user terminals, to execute a connection establishment process in response to a connection request from a user terminal included in the connection allowable group, and to execute a request rejection process that rejects a connection request from a user terminal included in a group other than the connection allowable group.

* * * * *